(12) United States Patent
Fayfield et al.

(10) Patent No.: US 7,005,850 B2
(45) Date of Patent: Feb. 28, 2006

(54) MAGNETIC SENSOR SYSTEM AND METHOD FOR INSTALLING MAGNETIC SENSORS

(75) Inventors: Robert T. Fayfield, St. Louis Park, MN (US); Charles R. Dolezalek, Stacy, MN (US)

(73) Assignee: Sensonix, Inc., Plymouth, MN (US)

(*) Notice: Subject to any disclaimer, the term of this patent is extended or adjusted under 35 U.S.C. 154(b) by 108 days.

(21) Appl. No.: 10/370,790

(22) Filed: Feb. 20, 2003

(65) Prior Publication Data
US 2004/0164734 A1      Aug. 26, 2004

(51) Int. Cl.
*G01R 33/00*        (2006.01)
(52) U.S. Cl. ................... 324/220; 324/207.26
(58) Field of Classification Search .................
324/207.13–207.26, 219–220, 244, 252, 324/260–261, 242, 243, 331
See application file for complete search history.

(56) References Cited

U.S. PATENT DOCUMENTS

| | | | |
|---|---|---|---|
| 5,491,475 A | 2/1996 | Rouse et al. | |
| 5,850,192 A | 12/1998 | Turk et al. | |
| 2004/0108854 A1 * | 6/2004 | Nichols | 324/348 |
| 2005/0028606 A1 * | 2/2005 | Madden et al. | 73/779 |

* cited by examiner

*Primary Examiner*—Bot LeDynh
(74) *Attorney, Agent, or Firm*—Altera Law Group, LLC

(57) ABSTRACT

A magnetic sensor system and a method for installing magnetic sensors for detecting metal objects that allows ease of manipulation, control and access. A carrier conduit is used to position a magnetic sensor in an outer conduit. The outer conduit may be disposed beneath a surface where objects to be detected may be positioned. Alternatively, a conduit having multiple channels may be placed in a pathway. Magnetic sensors may be placed in the channels and a top placed over the conduit. Multiple embodiments for orienting the magnetic sensor systems are provided.

11 Claims, 15 Drawing Sheets

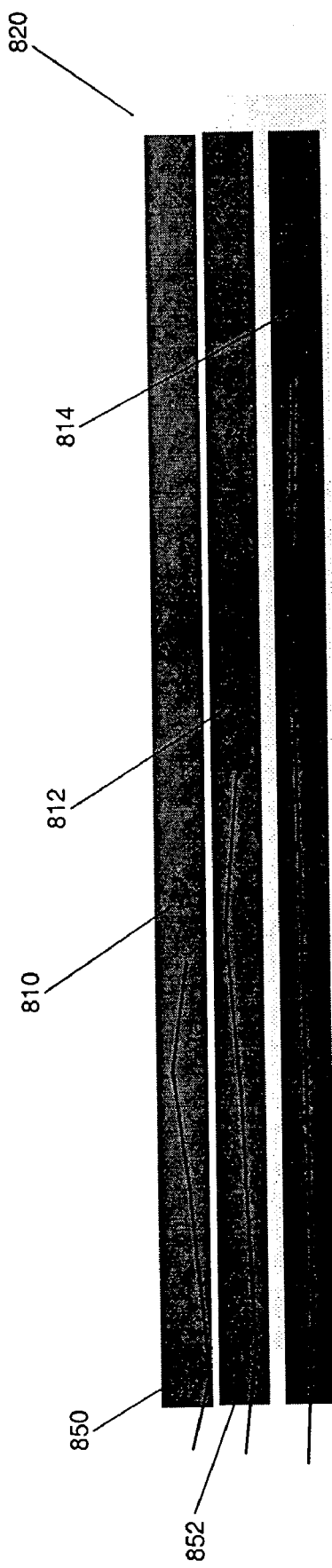
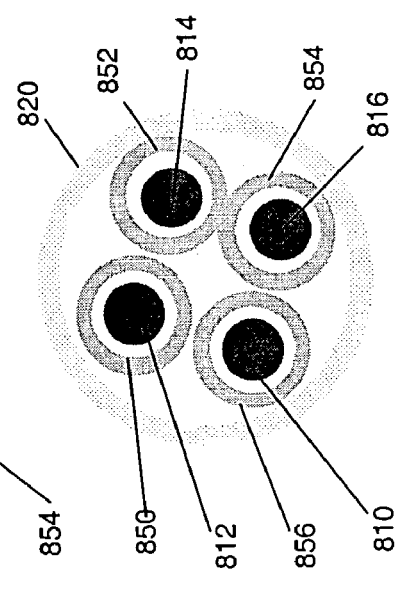
Fig. 8a
Fig. 8b

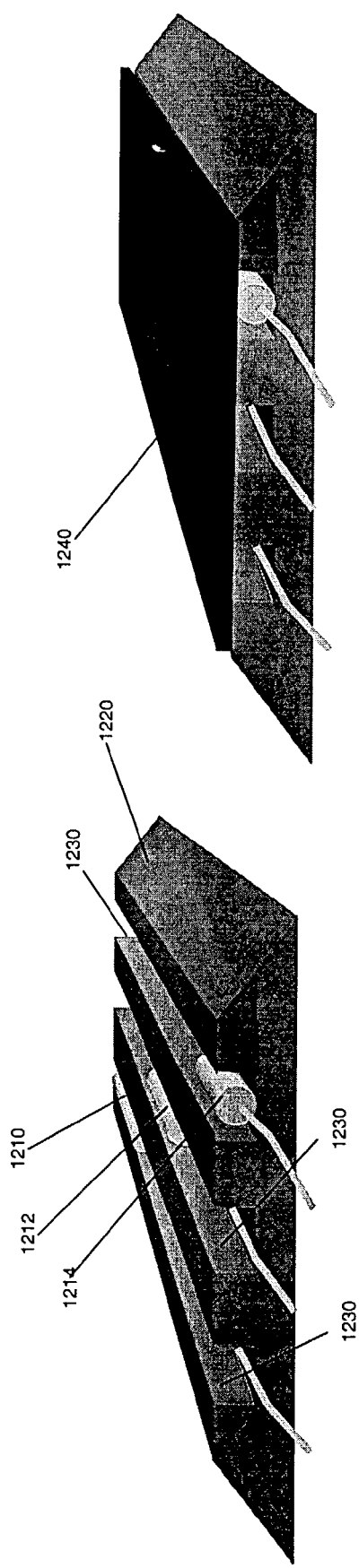
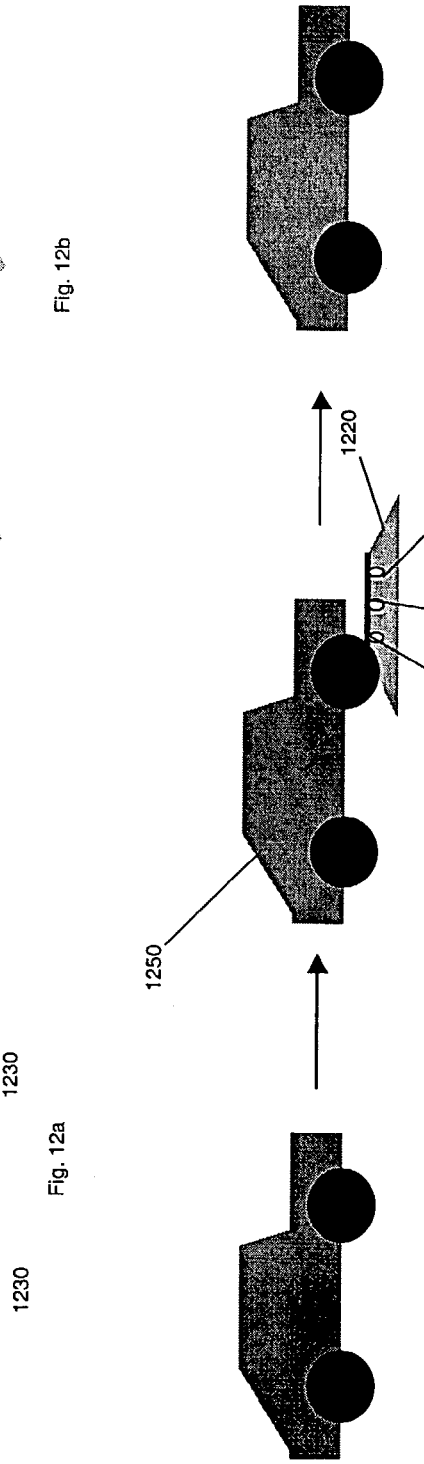
Fig. 12a
Fig. 12b
Fig. 12c

MAGNETIC SENSOR SYSTEM AND METHOD FOR INSTALLING MAGNETIC SENSORS

BACKGROUND OF THE INVENTION

1. Field of the Invention.

This invention relates in general to installation and orientation of magnetic sensors, and more particularly to a magnetic sensor system and a method for installing magnetic sensors for detecting metal objects.

2. Description of Related Art

Ferrous/large metal object detection is typically done with a buried active inductive loop sensor. The inductive loop is electrically oscillated and the metal object to be sensed changes the oscillation parameters in the loop. The loop is usually embedded in the surface on which the object to be detected is situated; in the case of vehicle detection on a roadway, four saw cuts are made, the inductive loop is placed in the saw cuts and the saw cuts are then filled or paved over. The loop wires are connected to a remote electronic loop controller system that generates the oscillating signal and does signal processing on the resultant perturbations caused by the vehicle or object to be detected. Multiple sensor capability requires the installation of multiple loops and loop controller electronics.

However, there are several disadvantages associated with buried active inductive loops. For example, buried active inductive loops require multiple long saw cuts and a sealing material in the surface. Further, each loop sensor requires an independent installation. In the case of traffic on a roadway, this means that the roadway must be closed to install or to perform maintenance on the inductive loop system. In addition, sealing materials can attack asphalt. Maintenance on buried active inductive loops is also difficult and expensive because the entire installation sequence must be repeated if a loop breaks, and in most cases a sensor loop must be offset from the original location because saw cuts cannot be reused. Still, buried active inductive loops are unreliable because such loops often break, particularly in hostile weather environments.

Moreover, technical problems exists with buried active inductive loops. Buried inductive loops provide limited information because such loops cannot easily measure vehicle velocity or classify vehicles. Furthermore, signal processing electronics are usually remotely located since the unit is not self-contained.

Some approaches exist that address these limitations and disadvantages. These are typically based on passive magnetometer sensing technology where the object to be detected perturbs the earth's magnetic compassing field. These perturbations are detected by the magnetic sensor and used to determine the presence or absence of an object. Advantages of these technologies are that they are more compact and can be self-contained with their signal conditioning electronics. Because the sensor is smaller, the number of installation options increases. In addition to sawing pavement, installing and refilling, these sensors can also be fit into rigid conduit that has either been buried in the pavement when the pavement was installed or inserted laterally into a hole bored beneath the pavement. With these alternate installation options, installation costs can be reduced and maintenance becomes significantly easier.

Prior magnetometers have been used wherein sensors are mounted in a custom sectional carrier track and fed piece by piece into an outer conduit. Unfortunately, in such an arrangement, the custom carrier must be cumbersome and complex to simultaneously accommodate multiple sensors and bends in the outer conduit. To maintain an individual sensor, the entire track (all sensors) must be withdrawn and re-inserted. Also, this particular technology is not self-contained; the sensor element is mounted in the conduit and the signal conditioning electronics are located remotely.

Another approach that has been used involves installation of multiple self-contained magnetometers in a custom conduit using a custom sectional carrier system. In this case, the sensor and electronics are self-contained. However, the materials are non-standard, the installation process is cumbersome and all sensors must be removed and re-installed to maintain a single sensor.

In some cases, there is also a need to provide a low cost means of installing multiple sensors under the object to be detected. In the vehicle detection example, multiple sensors provide more information allowing vehicles of interest to be detected while other vehicles that should not be detected are discriminated. In other cases there is a need to control the orientation and position of the sensors' coordinate axes relative to the objects to be detected. This ensures that the magnetic sensor is constrained so that it does not move relative to the background image over time and thereby register an undesired object detected signal when no object is actually present. In addition, in a multiple axis magnetic sensor, control of sensor orientation allows the user to gather information from different axes to better discriminate, separate and classify various objects to be detected or rejected. An example would be separating vehicles in one lane of a roadway from those in an adjacent lane of the roadway.

In all above applications, the sensors should be installed in such a way that they do not interfere with the object to be detected. In other words, the sensors should be located well below or well above the object to be detected. In addition the installation means should provide easy access to the sensors so that they may be easily removed, maintained and accurately repositioned. There is also sometimes a need to be able to position and manipulate the sensors under the object to be detected from a displaced, remote position. There is also sometimes a need to position the sensor in the remote position through bends, twists and angles. Ideally, the installation materials should be completely standard and commonly available.

It can be seen then that there is a need for a magnetic sensor system and a method for installation of magnetic sensors that provides ease of manipulation, control and access.

SUMMARY OF THE INVENTION

To overcome the limitations in the prior art described above, and to overcome other limitations that will become apparent upon reading and understanding the present specification, the present invention discloses a magnetic sensor system and a method for installing magnetic sensors for detecting metal objects.

The present invention solves the above-described problems by providing a magnetic sensor system that allows ease of manipulation, control and access. A carrier conduit is used to position a magnetic sensor in an outer conduit. The outer conduit may be disposed beneath a surface where objects to be detected may traverse or be positioned. Alternatively, a conduit having multiple channels may be placed in a pathway. Magnetic sensors may be placed in the channels and a top may be placed over the conduit. Multiple embodiments for orienting these magnetic sensor systems are provided. The carrier conduit is semi-rigid, which means that the carrier conduit exhibits sufficient rigidity to allow the carrier conduit to be pushed along its longitudinal axis by applying pressure at one end of the carrier conduit and that the carrier conduit is flexible enough to allow the assembly to negotiate easily around bends or corners.

A magnetic sensor system in accordance with the present invention may include a semi-rigid, elongated first conduit having a predetermined length and a magnetic sensor disposed at a desired position in the semi-rigid, elongated first conduit.

In another embodiment of the present invention, a magnetic sensor system is provided. The magnetic sensor system includes a plurality of semi-rigid, elongated first conduits having a predetermined length, at least one magnetic sensor disposed at a desired position in at least one of the plurality of semi-rigid, elongated first conduits and a second conduit for providing a pathway for guiding the plurality of semi-rigid, elongated first conduits.

In another embodiment of the present invention, another magnetic sensor system is provided. This magnetic sensor system includes at least one magnetic sensor and a conduit including at least one channel for channeling the at least one magnetic sensor.

In another embodiment of the present invention, a method for forming a magnetic sensor system is provided. The method includes providing a semi-rigid conduit of a desired length, threading a magnetic sensor and cable through the semi-rigid conduit and orienting and seating the magnetic sensor in the semi-rigid conduit.

In another embodiment of the present invention, another method for forming a magnetic sensor system is provided. This method includes providing a first conduit for providing a pathway and routing through the first conduit a magnetic sensor system comprising a magnetic sensor disposed at a desired position in a semi-rigid, elongated conduit.

In another embodiment of the present invention, another method for forming a magnetic sensor system is provided. This method includes providing an first conduit for providing a pathway, the first conduit comprising a plurality of channels and installing at least one magnetic sensor in at least one of the plurality of channels at a desired position.

In another embodiment of the present invention, a method for orienting a magnetic sensor system within an outer conduit is provided. The magnetic sensor includes a carrier conduit and a magnetic sensor disposed at a desired position therein. The method includes aligning a mark disposed along the carrier conduit in a predetermined orientation relative to the outer conduit.

In another embodiment of the present invention, a method for orienting a magnetic sensor system is provided, wherein the magnetic sensor system includes a semi-rigid carrier conduit and a magnetic sensor disposed at a desired position therein, the carrier conduit further being torsionally rigid. The method includes installing the magnetic sensor system with a first axis orientated substantially parallel to earth's surface, imposing a magnetic field proximate to the magnetic sensor system in a known position relative to the magnetic sensor, polling output values of the magnetic sensor representing the second and third axes that are orthogonal to the first axis and rotating the magnetic sensor until an output value of the sensor for the second or third axis achieves a desired relationship to the imposed magnetic field based on the known position of the imposed magnetic field relative to the magnetic sensor.

In another embodiment of the present invention, a method for orienting a magnetic sensor system is provided, wherein the magnetic sensor system includes a semi-rigid carrier conduit and a magnetic sensor disposed at a desired position therein. This method includes storing a known magnetic field measurement in memory of a magnetic sensor system, installing the magnetic sensor system with a first axis orientated substantially parallel to earth's surface, polling output values of the magnetic sensor representing the second and third axes that are orthogonal to the first axis, mathematically rotating the output values of the magnetic sensor representing the second and third axes until an output value of the sensor for the second or third axis is equal to the known magnetic field stored in memory, determining the angle when either the output value of the magnetic sensor for the second or third axis is substantially equal to the known magnetic field stored in memory and mathematically rotating output values of the magnetic sensor representing the second and third axis by the determined angle to produce calibrated outputs for the sensors for the second and third axes.

In another embodiment of the present invention, a method for orienting a magnetic sensor system is provided, wherein the magnetic sensor system includes a semi-rigid carrier conduit and a magnetic sensor disposed at a desired position therein, the carrier conduit further being torsionally rigid. The method includes installing the magnetic sensor system with a first axis orientated substantially parallel to earth's surface, generating tilt readings from an accelerometer included with the magnetic sensor to determine a vertical axis and rotating a second and third axis that is orthogonal to the first axis until the second or third axis coincides with the determined vertical axis.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 8 illustrates the installation of multiple sensors located at different distances along the outer conduit;

FIGS. 12a–c illustrate another embodiment for installing magnetic sensors for detecting metal objects;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a magnetic sensor system and a method for installing magnetic sensors for detecting metal objects that allows ease of manipulation, control and access. A magnetic sensor system includes a semi-rigid, elongated first conduit having a predetermined length and a magnetic sensor disposed at a desired position in the semi-rigid, elongated first conduit.

The semi-rigid elongated first conduit having the magnetic sensor disposed therein may be positioned in an outer conduit. The outer conduit may be disposed beneath a surface where objects to be detected may be positioned, e.g., statically or temporarily while traversing the surface. Alternatively, a conduit having multiple channels may be placed in a pathway. Magnetic sensors may be placed in the channels and a top may be placed over the conduit. Multiple embodiments for orienting these magnetic sensor systems are provided.

Figure 1:
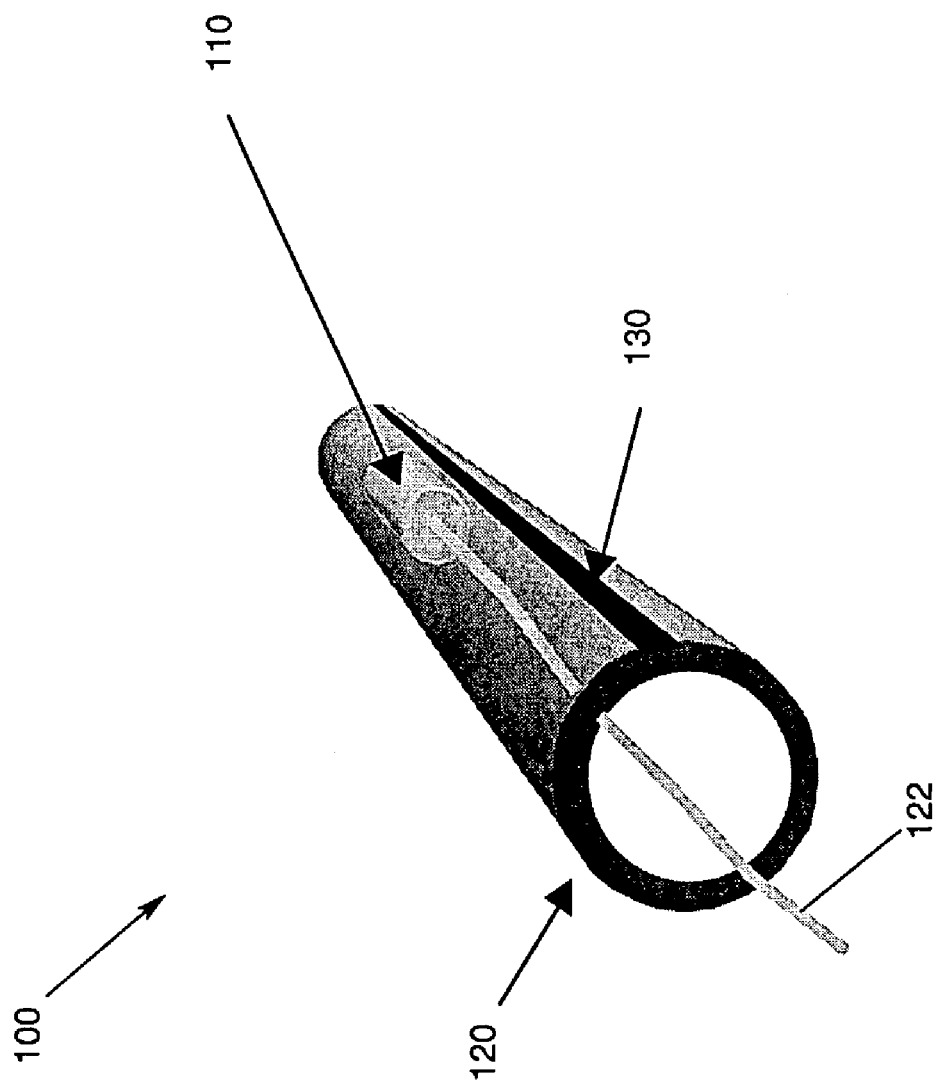
FIG. 1 illustrates a semi rigid conduit magnetic sensor assembly according to the present invention.

FIG. 1 illustrates a semi rigid conduit magnetic sensor assembly 100 according to the present invention. In FIG. 1, a sensor 110 is installed in a length of semi-rigid "carrier" conduit 120. As used herein, semi-rigid means that the carrier conduit 120 exhibits sufficient rigidity to allow the carrier conduit 120 to be pushed along its longitudinal axis by applying pressure at one end of the carrier conduit 120 and that the carrier conduit 120 is flexible enough to allow the assembly 100 to negotiate easily around bends or corners. The carrier conduit 120 may also exhibit good torsional rigidity along the length of the semi-rigid carrier conduit 120 such that the distal end of the semi-rigid carrier conduit 120 responds to angular motion applied at the proximal end of the semi-rigid carrier conduit 120 to promote ease of maneuverability.

The semi-rigid carrier conduit 120 and the sensor 110 housing are both preferentially circular in cross section. The sensor 110 may be fitted at the end of the length of semi-rigid conduit 120 or anywhere along its length inside of the semi-rigid conduit 120. Signals from the sensor are provided externally by signal line 122. Ideally, the sensor 110 is fixed relative to the carrier conduit 120 either by friction fit or some other fastening means; this ensures that the orientation and position of the sensor 110 housing are well known relative to the orientation and position of the carrier conduit 120.

The sensor/carrier conduit assembly 100 provides an easily slidable sensor system for insertion into an outer conduit. The length of carrier conduit 120 and/or the position of the sensor 110 in the semi-rigid carrier conduit 120 may be used to accurately determine the location of the sensor 110 along the length of an outer conduit and thereby its position relative to the objects to be detected. Additionally, a stripe 130 or marking on the outside of the inner conduit 120 may be used to control its angular orientation subsequent to installation. A fuller description of methods for controlling the orientation of the sensor 110 will be described later herein.

Figure 2:
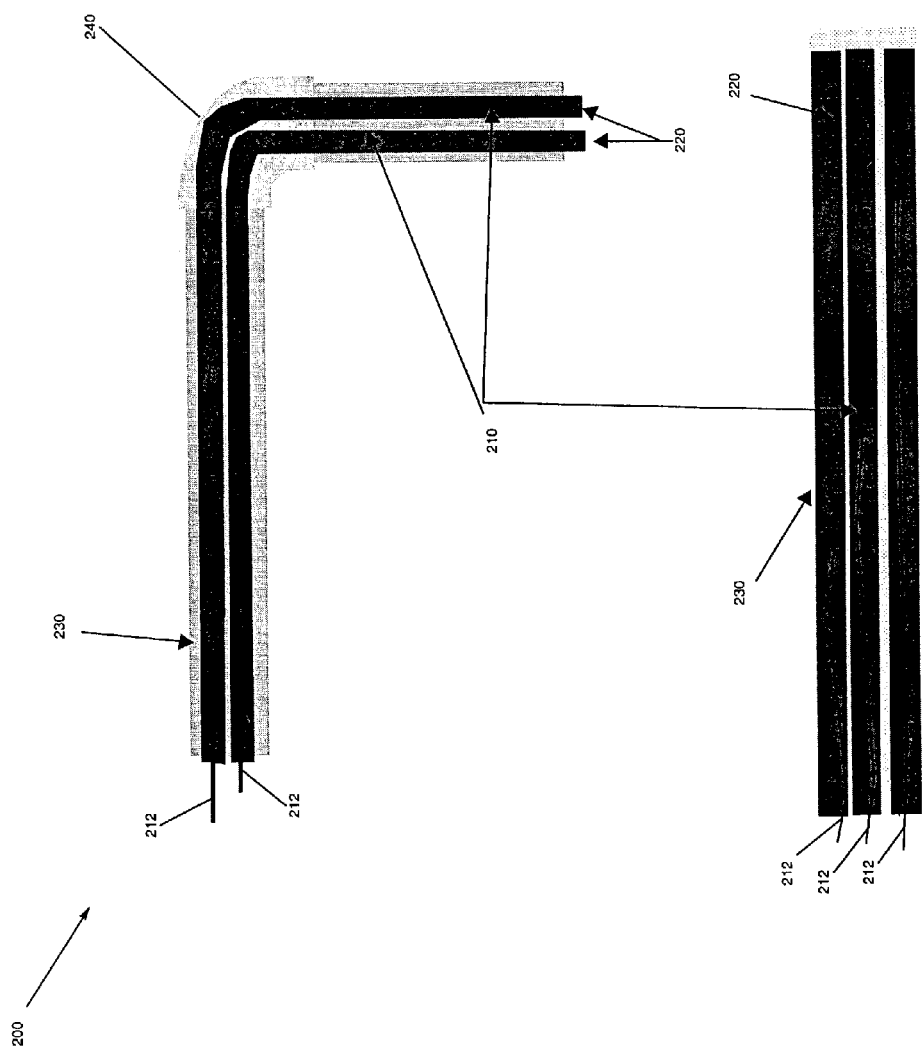
FIG. 2 illustrates the installation of a magnetic sensor assembly according to the present invention.

FIG. 2 illustrates the installation of a magnetic sensor assembly 200 according to the present invention. Each sensor 210 and its associated cable 212 is positioned into a length of semi-rigid inner carrier conduit 220. For example, a sensor 210 may be inserted a length of semi-rigid inner carrier conduit 220 using fish tape, which generally includes a thin yet resilient strip or rod of metal or plastic having a loop or other attachment on one end. Multiple sensors 210 can be easily installed in the outer conduit 230 by using multiple sections of semi-rigid inner carrier conduit 220; each individual sensor 210 can be accurately installed at a defined position. The outer conduit 230 can contain one or more bends 240 and the inner semi-rigid conduits 220 can still be easily slid into position. One or more of the inner semi-rigid conduits 220 can be removed, maintained and/or repositioned easily without disturbing or disrupting the remaining sensors 210 or the objects to be detected (not shown).

Figure 3:
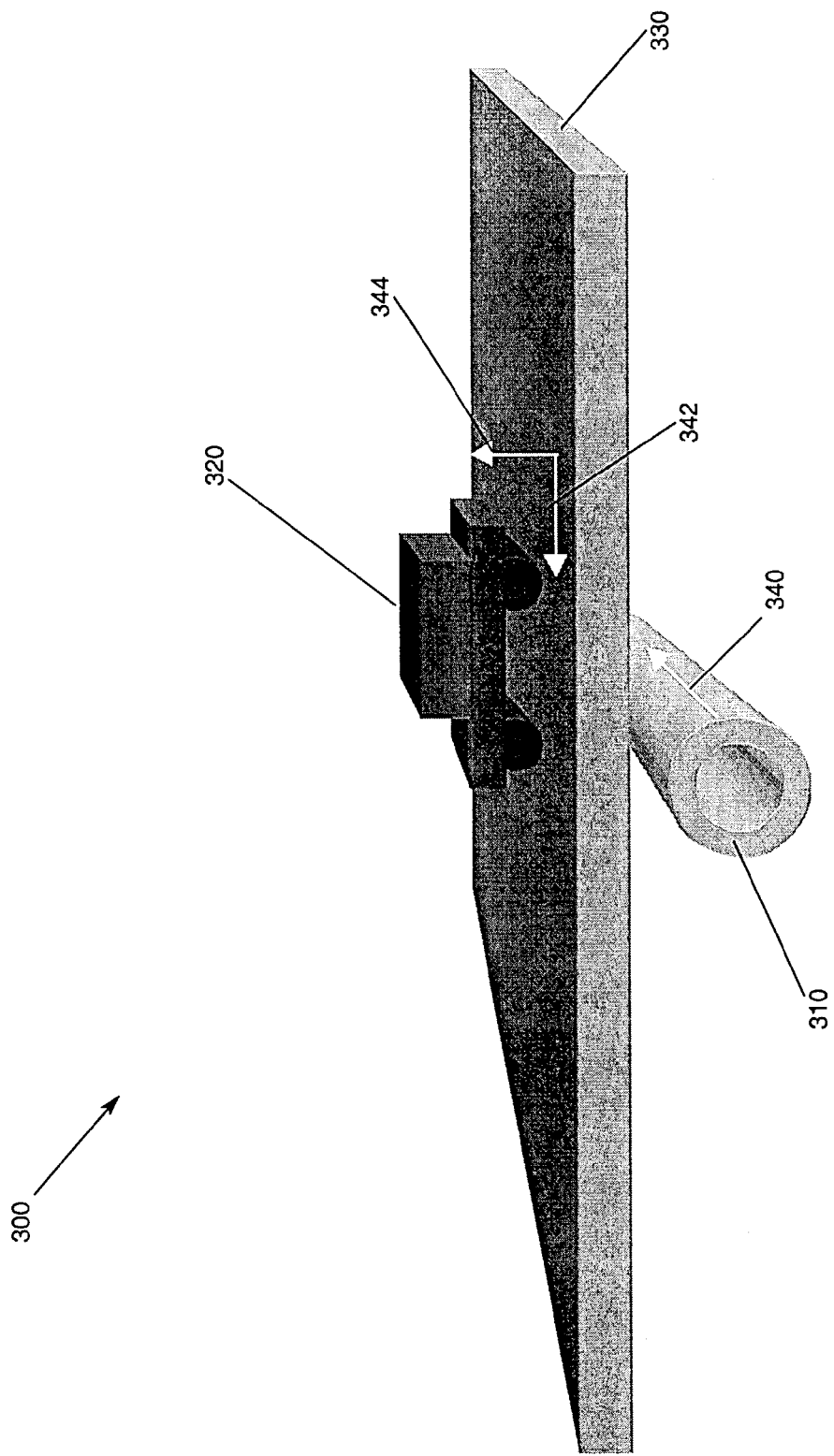
FIG. 3 illustrates the three sensing axes provided by a magnetic sensors installation according to the present invention.

FIG. 3 illustrates the three sensing axes provided by a magnetic sensors installation 300 according to the present invention. An outer conduit 310 of a fixed diameter is installed below the object 320 to be detected. For example, this can be easily done in the case of vehicles on roadway 330 without interrupting the passage of the vehicles 320 by using a boring machine to laterally bore a tubular hole below the surface of a roadway. The outer conduit 310, e.g., a rigid PVC tube or channel, can then be easily inserted into the tubular hole. In a typical vehicle detection installation, the outer conduit 310 would be installed below the surface of a road 330, orthogonal to the direction of traffic flow. Alternatively, the outer conduit 310 can be placed onto a surface before it is paved or concrete is poured. After paving, the outer conduit 310 is embedded into position. The sensor/carrier conduit assembly (not shown) would then be positioned within the outer conduit 310 so that the position of one sensing axis 340 (e.g., Y axis) lies along the outer conduit, a second sensing axis 342 (e.g., X axis) lies along the direction of traffic flow and a third sensing axis 344 (e.g., Z axis) is normal to the earth's surface. The sensor orientation is therefore maintained relative to the roadway 330 and the vehicle travel. This prevents false indications of the presence of an object 320 as the orientation of the sensor with respect to the earth's magnetic field changes. In addition, controlling the coordinate axes of a three-axis magnetic sensor relative to the outer conduit 310 can provide more information about the objects to be detected. For example, if the orientation of the sensor is controlled relative to the outer conduit, the X, Y and Z components of the earth's magnetic field components can be processed independently to provide more detailed information about the object 320 to be detected.

Figure 4:
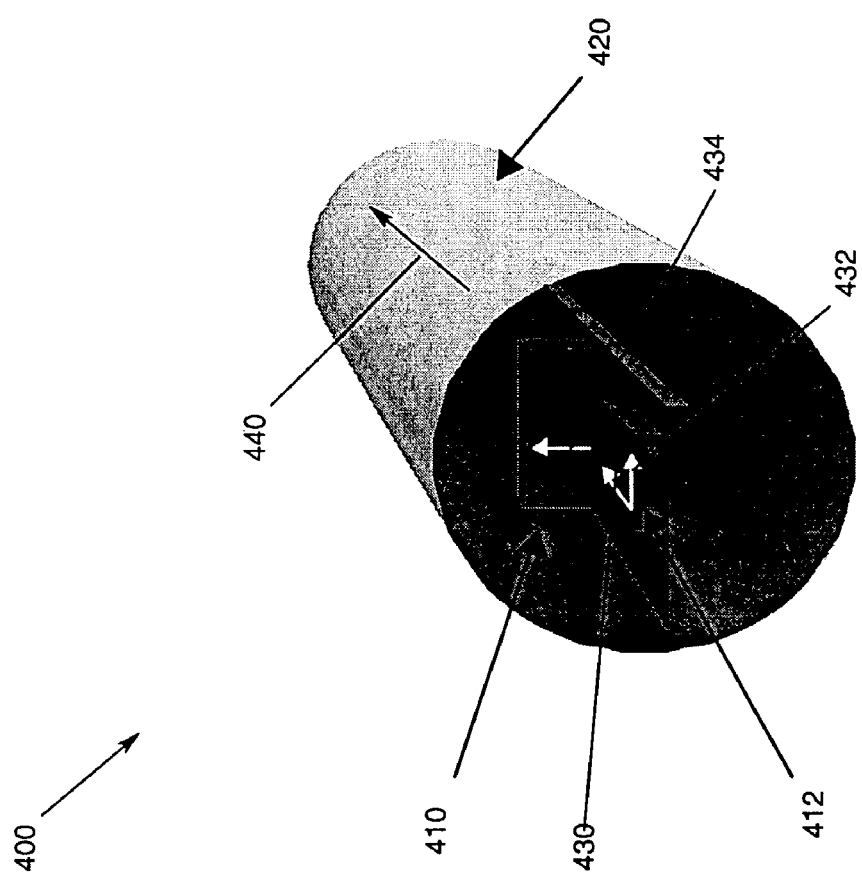
FIG. 4 illustrates a cutaway view of a magnetic sensor according to the present invention.

FIG. 4 illustrates a cutaway view of a magnetic sensor 400 according to the present invention. In FIG. 4, magnetic sensors 410, 412 are disposed within a sensor housing 420. The individual sensing axes 430–434 of magnetic sensors 410, 412 can be accurately controlled within the magnetic sensor housing 420 during manufacture so that the problem reduces to controlling and maintaining the orientation of the magnetic sensor 400 during and after installation into the outer conduit (not shown) and also constraining the position of the sensor unit 400 so that it does not move over time or by vibration. As illustrated in FIG. 1, an external marking 130 that signifies a position of one of the sensor axes may be provided on the inner conduit 120. For a magnetic sensor unit 400 manufactured in the preferred form factor of a cylindrical barrel housing 420, the axis of the barrel can be made to correspond to one of the sensing axes as shown. In this case, the barrel housing axis 440 is coincident with the Y sensing axis 430. If the axis of the barrel housing 440 can be made to lie substantially coaxial with the axis of the outer conduit (not shown), the earth's Y axis magnetic field data may be acquired and processed separately from the X 432 and Z 434 axes data. The X 432 and Z 434 axes are also controlled within the barrel housing 440 and correspond to features on the sensor. This provides more information from which to discriminate and separate detected objects with. If additional information from the individual X 432 and Z 434 sensing axes is required, the semi-rigid inner carrier conduit (not shown) can be rotated inside of the outer conduit (not shown) until the X 432 and Z 434 sensor axes coincide with the external world's coordinate system. Thus, the axis of the sensor coaxial 440 is easily aligned with the axis of the outer conduit (not shown) while maintaining free and easy positioning and rotation of one or more sensors in the outer conduit (not shown).

Figure 5:
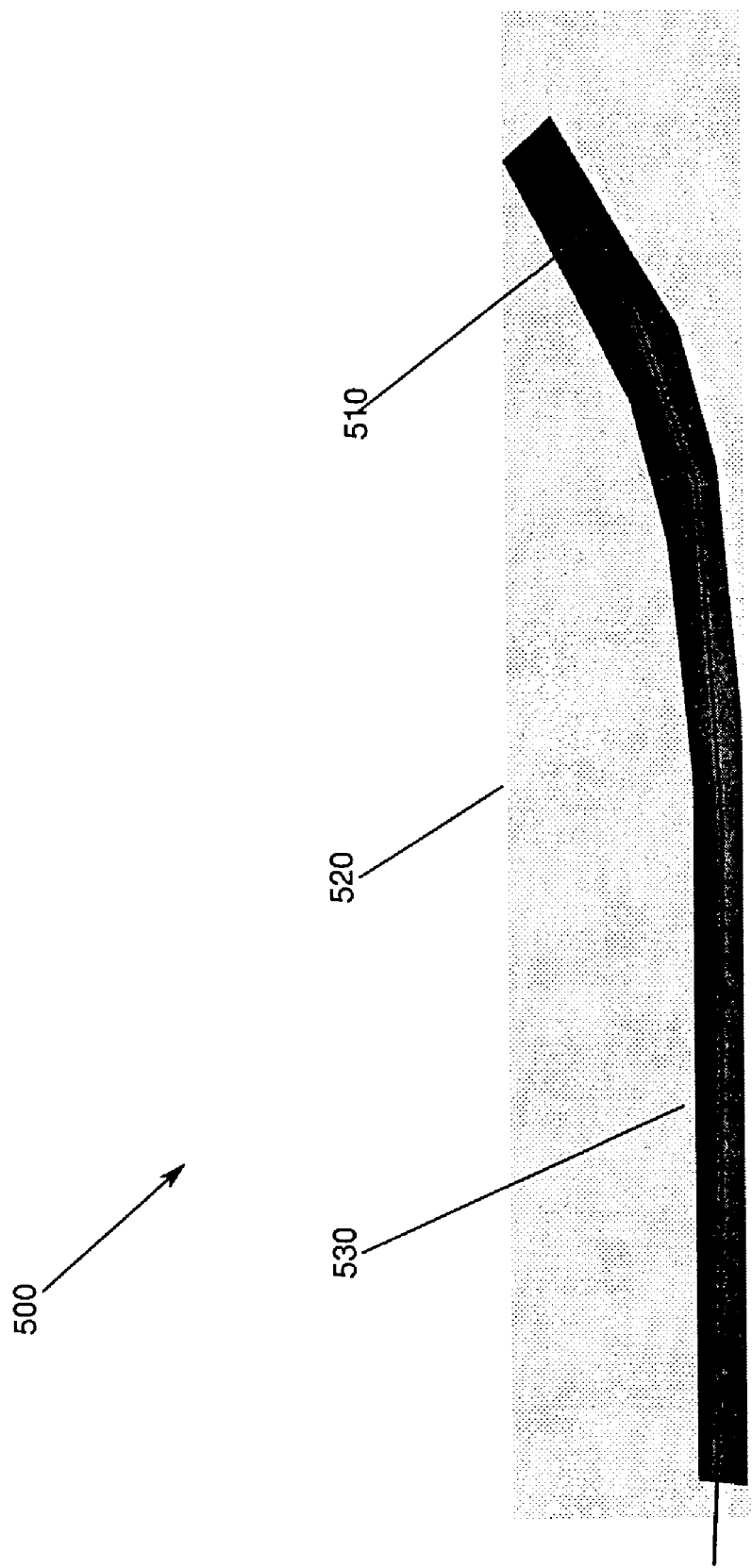
FIG. 5 illustrates one embodiment of a sensor installation according to the present invention.

FIG. 5 illustrates one embodiment of a sensor installation 500 according to the present invention. In FIG. 5, a single sensor is mounted in larger outer conduit 520. FIG. 5 shows that the position of the sensor 510 can diverge from the axis of the outer conduit 520 and easily move around. Because the carrier conduit 530 is substantially smaller than the outer conduit 520, the inner carrier conduit 530, the axis of the sensor barrel and the Y sensing axis can deviate from the axis of the outer conduit 520 by a substantial angle. This creates uncertainty between the coordinate axes of the sensor 510 and the known coordinate axes of the physical world (e.g., is the Y axis parallel to the earth's surface?). In addition, the sensor 510 can easily move around over time in the outer conduit 520 if the conduit is vibrated or otherwise disturbed because it is not constrained along the length of the outer conduit 520. This could impact the background calibration of the sensor 510 and in the worst case, be registered as an 'object detected' due to the movement of the sensor 510 rather than an actual object being present.

Figure 6:
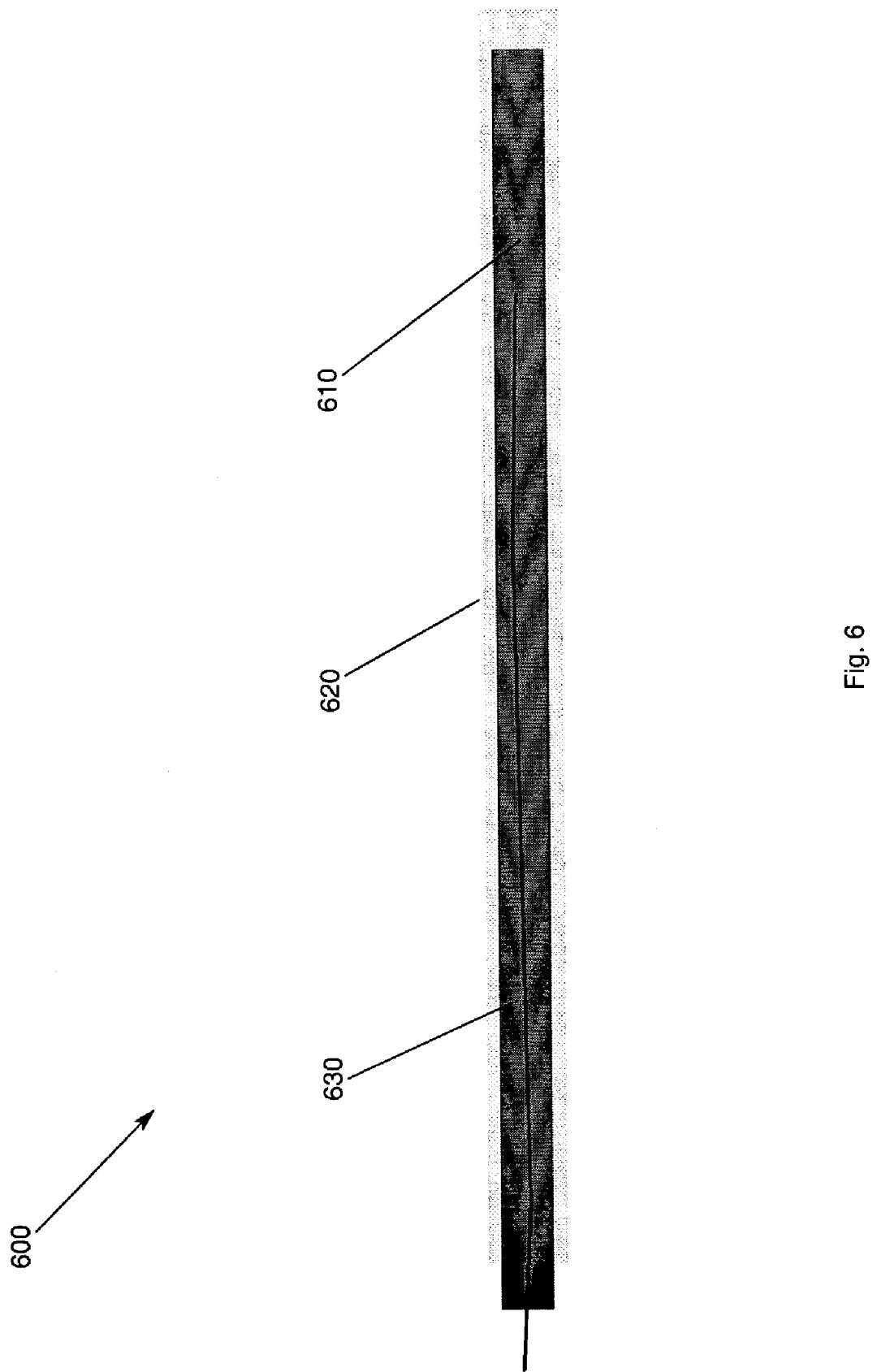
FIG. 6 illustrates a restrictive sensor installation according to the present invention.

FIG. 6 illustrates a restrictive sensor installation 600 according to the present invention. In FIG. 6, an outer conduit 620 with a smaller diameter is used to constrain the sensor 610 and carrier conduit 630 to lie more substantially along the conduit's axis. Unfortunately, this limits the installation to a single sensor and makes maneuverability around bends and angles more difficult.

Figure 7A:
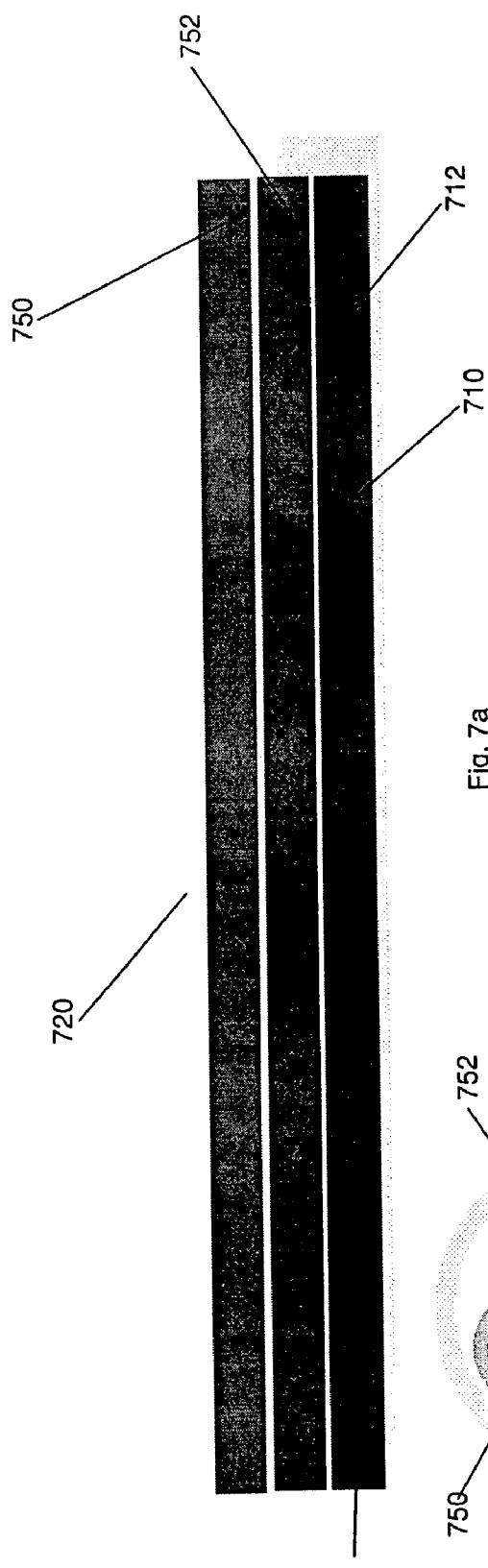
FIGS. 7a–b illustrate a single sensor installed with multiple dummy tubes to constrain the position and orientation of the single sensor according to the present invention.
Figure 7B:
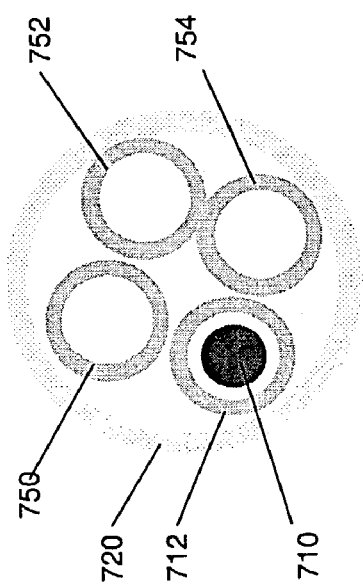

FIGS. 7a–b illustrate a single sensor 710 installed with multiple dummy tubes 750, 752, and 754 to constrain the position and orientation of the single sensor 710 according to the present invention. The outer conduit 720 is filled with multiple semi-rigid inner conduits 712, 750, 752 and 754. One or more semi-rigid conduits such as 712 includes a magnetic sensor unit 710. These multiple semi-rigid conduits 712, 750, 752 and 754 are very low cost and can be easily inserted into the outer conduit 720. The act of filling the outer conduit 720 forces each semi-rigid inner conduit 712, 750, 752 and 754 to lay substantially along the axis of the outer conduit 720 thereby reducing the displacement angle between the Y sensor axis and the outer conduit 720. This also prevents undesired movement of the sensor or sensors 710 once they have been calibrated so as not to register a false object detected signal.

FIG. 8 illustrates the installation of multiple sensors 810–816 located at different distances along the outer conduit 820 and where the inner conduits 850–856 are all of equal length. This helps maintain the orientation of all sensors 810–816.

Figure 9:
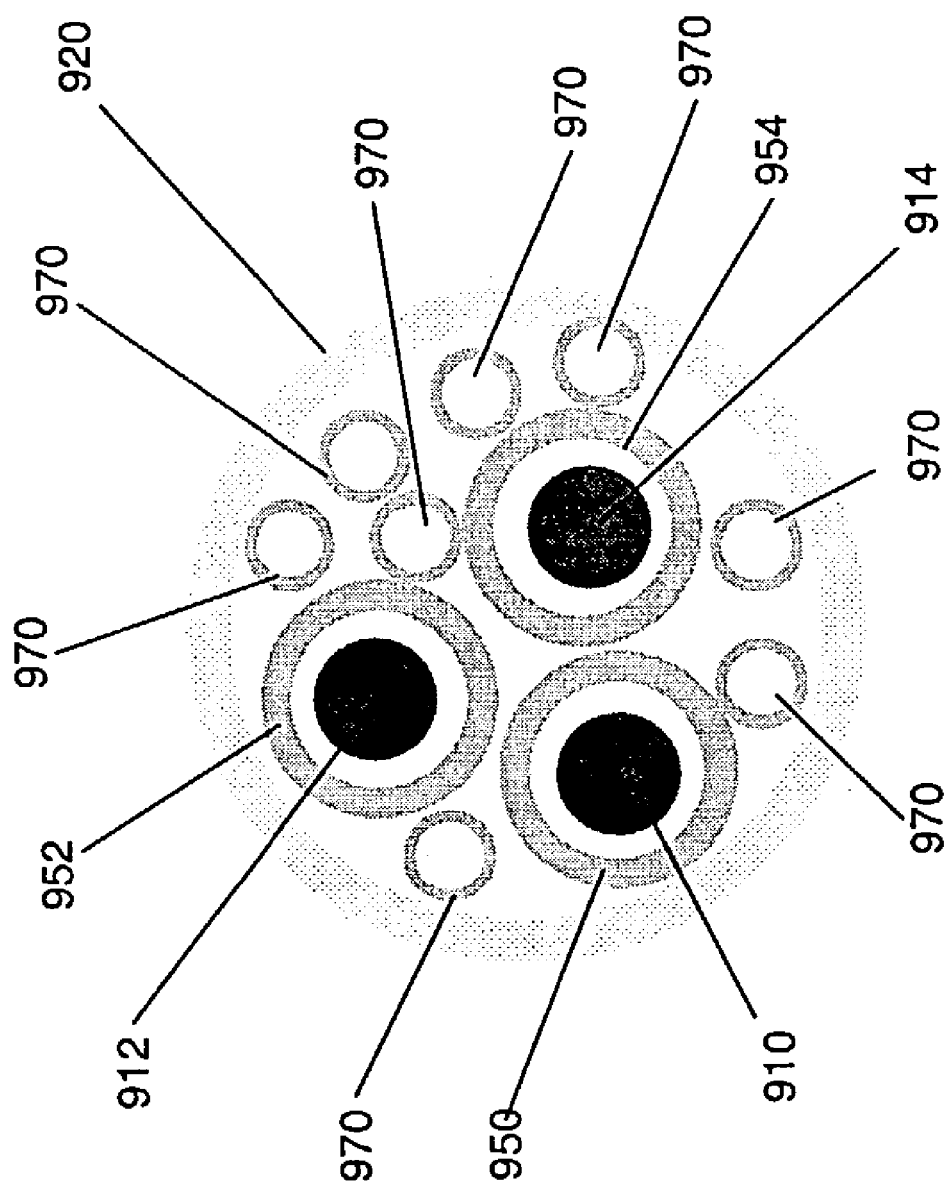
FIG. 9 illustrates a cross sectional view of multiple sensors installed in multiple carrier conduits, wherein the outer conduit 920 is filled with additional dummy conduits of smaller diameter than sensor carrier conduits.

FIG. 9 illustrates a cross sectional view of multiple sensors 910–914 installed in multiple carrier conduits 950–954, wherein the outer conduit 920 is filled with additional dummy conduits 970 of smaller diameter than sensor carrier conduits 950–954. In FIG. 9, the more fully the outer conduit 920 is filled with additional dummy conduits 970, the more substantially the axes of the sensors 910–914 are forced to lay along the axis of the outer conduit 920. Therefore, the present invention may use multiple dummy filler conduits 970 to better fill the outer conduit 920 without compromising the maneuverability of the sensor conduits 950–954. Also, the filler conduits 970 may be of a different diameter than the carrier conduits 950–954. For example, once the sensor carrying conduits 950–954 have been positioned, the user might subsequently install multiple small diameter dummy conduits 970 to fill in the space and better pin the sensor orientation in place.

The present invention thus solves the problem of making the axis of the magnetic sensing unit coincide with the axis of the outer conduit thereby unambiguously controlling one of the magnetic sensing unit axes (Y axis in these examples) and stabilizing the sensor so that it does not move substantially over time. This amount of orientation control is sufficient for many signal processing algorithms. However, if the user wants additional information from the individual X and Z sensing axes relative to the coordinate system of the outside world, the X and Z sensing axes must be adjusted or rotated from a location which is remote to the sensor.

According to the present invention, the sensor is fastened to the inner carrier conduit position so a particular sensor's X and Z sensing axes can be adjusted by rotating that sensor's inner carrier conduit and monitoring some feedback signal until the signal indicates that the X and Z axes are aligned in the desired direction. Again, by simple displacement, the additional inner semi-rigid conduits force the rotating semi-rigid conduit axis to stay coincident with the outer conduit axis so that only the X and Z position changes relative to the external coordinate system as the conduit is rotated; the Y sensing axes remains co-axial with the outer conduit.

Referring again to FIG. 1, a first feedback mechanism is illustrated for controlling the orientation of the sensor. In FIG. 1, an external marking 130 that signifies a position of one of the sensor axes may be provided on the inner conduit 120, e.g., such as a stripe along its length, for tracking the orientation of one of the axes the sensor 110 in the outer conduit (not shown). The mark 130 may then be aligned in a desired position, e.g., relative to an outer conduit (not shown). If both ends of the inner conduit can be accessed at either end of the outer conduit (not shown), the marking can be held in the same orientation at both ends thereby controlling the orientation of the sensor 110 anywhere along the length of the outer conduit (not shown).

Figure 10:
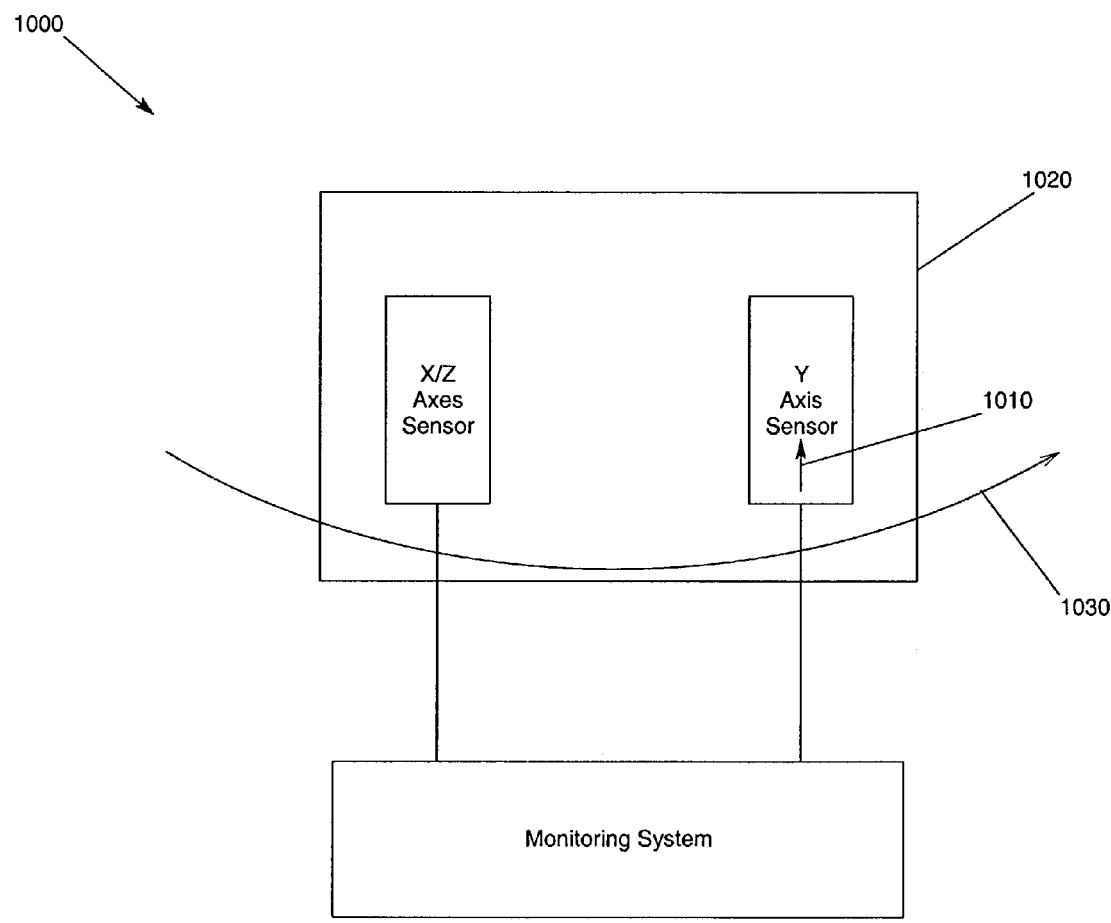
FIG. 10 illustrates a second mechanism for controlling the orientation of the sensor according to the present invention.

FIG. 10 illustrates a second mechanism for controlling the orientation of the sensor 1000 according to the present invention. FIG. 10 illustrates the monitoring of a known magnetic field component to track the orientation of the sensor's Z-X plane. If the Y sensor axis 1010 is known to lay substantially along the axis of the conduit so that the Y axis 1010 in this example is well established, another vector component of magnetic field, such as the Z axis of the earth's magnetic field, may be used to orient the X or Z axes about the Y axis. For example the earth's Z axis magnetic field could be measured at a surface where an object is to be detected. Because this field does not change very much as a function of depth, the inner conduit sections with sensors 1020 could be rotated 1030 until one of the sensor's remaining axes (X or Z) reports a magnetic field that is substantially equal to the earth's known Z axis magnetic field. If inner conduit is now locked at its present position, the sensor axis that substantially equals the earth's magnetic field Z axis component can be assigned as the sensor's new Z axis. It is not important whether this was originally the sensor's X axis or Z axis since these axes are orthogonal. In this way, the orientation of the sensor's three axes are uniquely related to the three axes of external (world's) coordinate system.

Figure 15:
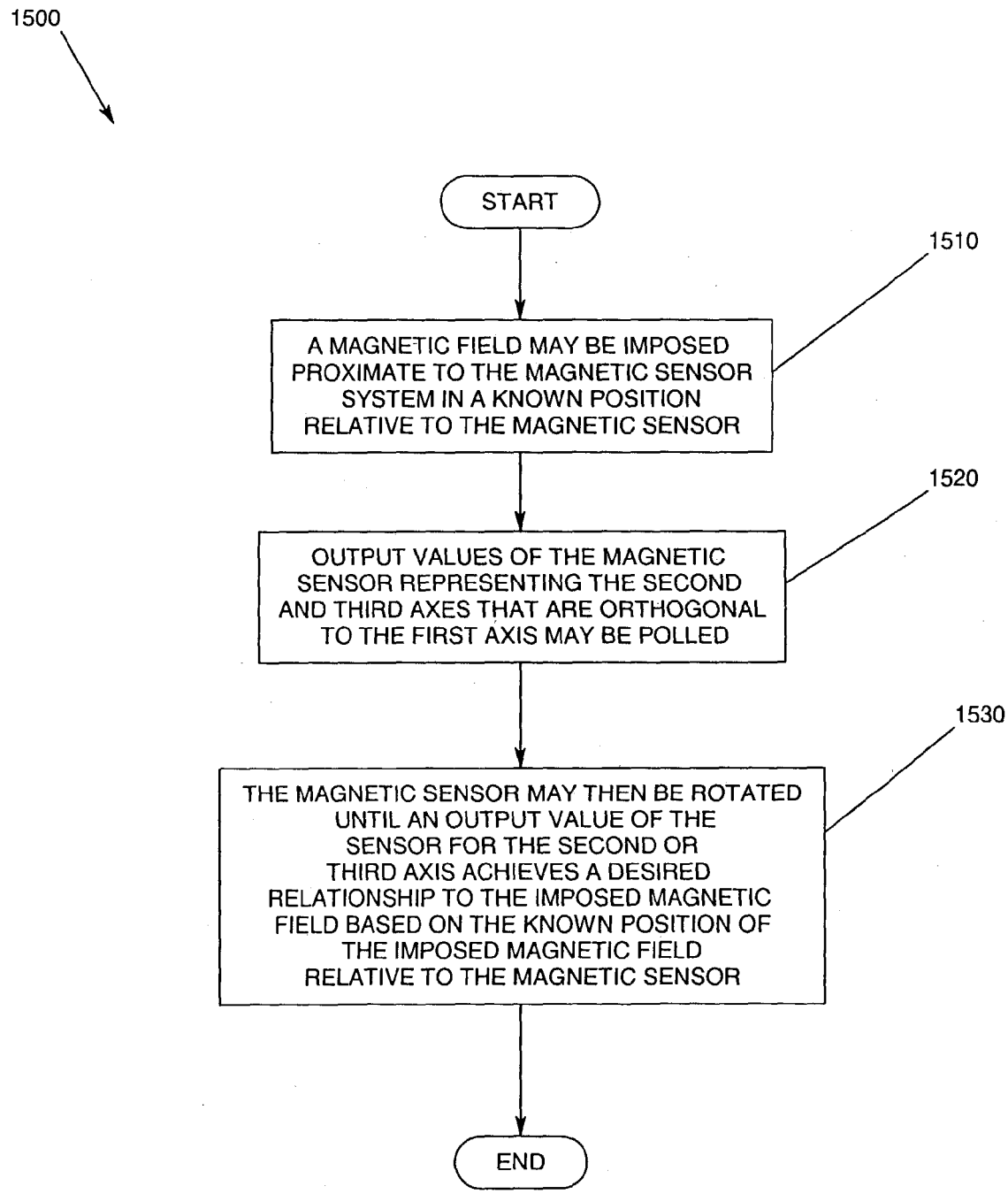
FIG. 15 illustrates a flow chart of a method for controlling the orientation of the sensor according to the present invention using an magnetic field imposed proximate to the magnetic sensor system in a known position relative to the magnetic sensor.

This concept behind this process may be expanded as illustrated in FIG. 15. A magnetic field may be imposed proximate to the magnetic sensor system in a known position relative to the magnetic sensor 1510. Output values of the magnetic sensor representing the second and third axes that are orthogonal to the first axis may be polled 1520. The magnetic sensor may then be rotated until an output value of the sensor for the second or third axis achieves a desired relationship to the imposed magnetic field based on the known position of the imposed magnetic field relative to the magnetic sensor 1530.

Figure 11:
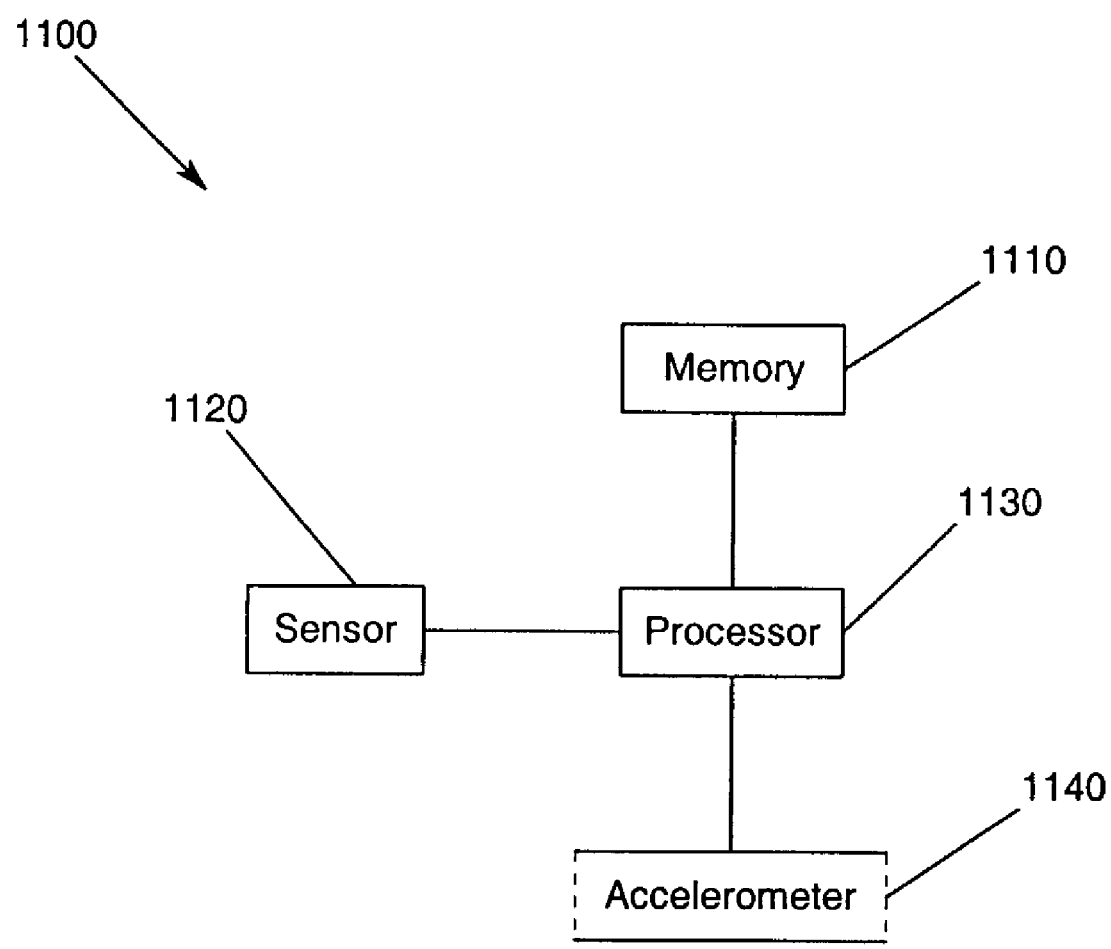
FIG. 11 illustrates a block diagram of one embodiment of a sensor according to the present invention.

A third and fourth embodiment of a method for controlling the orientation of the sensor according to the present invention will be illustrated with reference to FIG. 11. FIG. 11 illustrates a block diagram of one embodiment of a sensor 1100 according to the present invention. According to a third embodiment for controlling the orientation of the sensor according to the present invention, if a known magnetic field, e.g., the earth's Z axis field, is stored in the memory 1110, the processor 1130 can periodically poll the sensor 1120 X and Z axes output values and if one of them does not substantially equal the known value stored in memory 1110, the processor 1130 could mathematically perform iterative rotations around the sensor's Y axis in firmware creating orthogonal X' and Z' axes that can be compared with the known field stored in memory 1110. When either the X' or Z' axis substantially equals the known field stored in memory 1110 at that location, an angle can be determined and used in firmware to mathematically rotate the sensor's original X and Z axes to new X' and Z'. These new axes would be used for subsequent signal processing calculations A known gravitational acceleration field can be used in a similar manner to that described above to provide a fourth embodiment for controlling the orientation of the sensor according to the present invention. If an accelerometer 1140 is included and the sensor's Y axis is determined to lay substantially along the axes of the outer conduit, the tilt readings from the accelerometer can be used to rotate the X and Z sensing axes, either physically or mathematically, until one of them coincides with the Z axis of the external (world's) coordinate system as determined by the accelerometer.

FIGS. 12*a–c* illustrate another embodiment for installing magnetic sensors for detecting metal objects. In FIG. 12*a*, multiple magnetic sensors 1210–1214 are mounted at different lateral positions in a drive-over conduit 1220. The drive-over conduit 1220 includes multiple channels 1230 (i.e., outer conduits) for the magnetic sensors 1210–1214. The channels 1230 of the present invention are not meant to be limited to a particular shape. Rather, the channels 1230 merely provide a pathway for insertion of the magnetic sensors 1210–1214. Further, some of the channels 1230 may contain multiple sensors 1210 while others contain no magnetic sensors 1210–1214. In addition, the magnetic sensors 1210–1214 may comprise the magnetic sensors assemblies discussed above, wherein a magnetic sensor is disposed within a carrier conduit.

After the magnetic sensors 1210–1214 are mounted at different lateral positions in the drive-over conduit 1220, a top 1240 may be installed as shown in FIG. 12*b*. FIG. 12*c* illustrates vehicles 1250 driving over the drive-over conduit 1220 and magnetic sensors 1210–1214.

Figure 13:
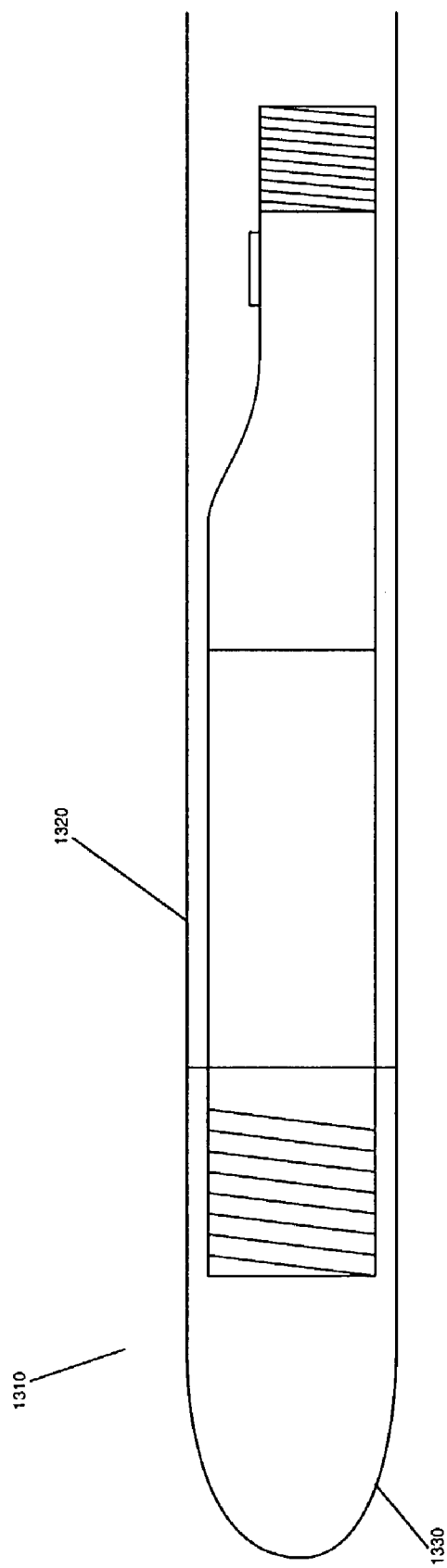
FIG. 13 illustrates a guide tip that may be applied to the sensor/carrier conduit assembly for preventing routing difficulties according to the present invention.

The sensor/carrier conduit assembly as illustrated in the above figures may be difficult to route through the outer conduits. For example, at bends in the outer conduit, glue may buildup and create an obstruction that blocks the path of the sensor/carrier conduit assembly. Accordingly, a guide tip 1310 as illustrated in FIG. 13 may be applied to the sensor/carrier conduit assembly 1320 to prevent routing difficulties. The distal end 1330 of the guide tip 1310 is curved to prevent the sensor/carrier conduit assembly 1320 from becoming obstructed during insertion of the sensor/carrier conduit assembly 1320. The present invention is not meant to be limited to a particular attachment method. For example, the guide tip 1310 may be friction fitted, threaded, glued, etc., onto the sensor/carrier conduit assembly 1320.

Figure 14:
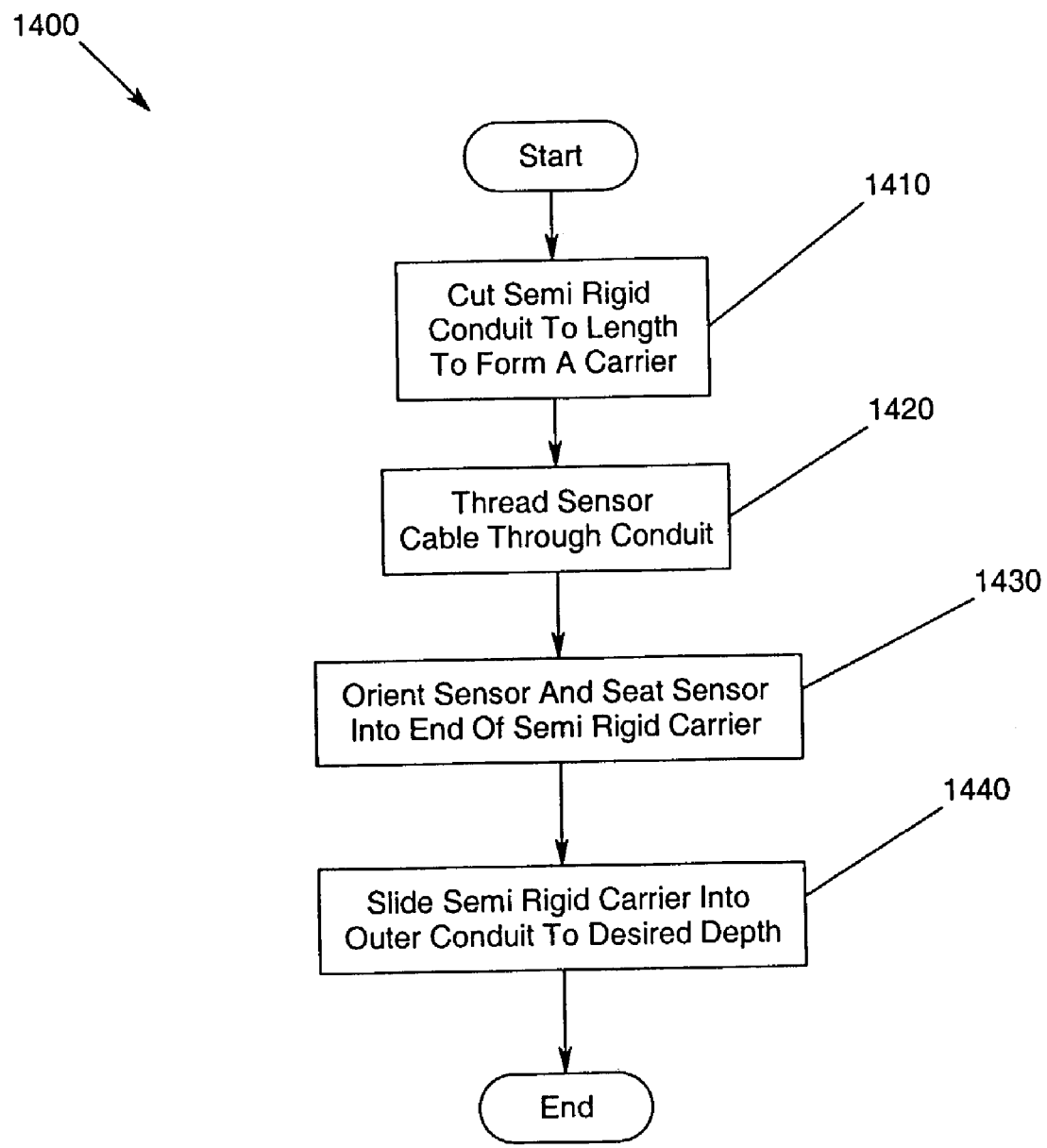
FIG. 14 illustrates a flow chart of a method for installing magnetic sensors for detecting metal objects.

FIG. 14 illustrates a flow chart 1400 of a method for installing magnetic sensors for detecting metal objects. In FIG. 14, a semi-rigid conduit of a desired length is provided 1410. For example, a roll of semi-rigid tubing may be cut to a desired length. A sensor and its cable are threaded through the semi-rigid conduit 1420. The sensor is oriented and seated into the semi-rigid conduit 1430. The semi-rigid conduit and sensor are positioned within an outer conduit such that the sensor is positioned at a desired depth within an outer conduit 1440.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A magnetic sensor system, comprising:
a semi-rigid elongated first conduit having a predetermined length; and
a magnetic sensor disposed at a desired position in the semi-rigid, elongated first conduit;
wherein the first conduit is torsionally rigid; and
wherein the first conduit includes a marker for rotationally aligning the first conduit.

2. The magnetic sensor system of claim 1, wherein the marker is aligned with a sensor feature.

3. The magnetic sensor system of claim 1 wherein the marker is a stripe along the length of the first conduit.

4. A magnetic sensor system, comprising:
- a semi-rigid elongated first conduit having a predetermined length;
- a magnetic sensor disposed at a desired position in the semi-rigid, elongated first conduit; and
- a second conduit for providing a pathway for guiding the first conduit.

5. The magnetic sensor system of claim 4 wherein the second conduit is disposed beneath a surface where objects to be detected are positioned.

6. The magnetic sensor system of claim 4 wherein the second conduit includes at least one bend.

7. The magnetic sensor system of claim 4 further comprising filler conduits for aligning the axis of the first conduit with the axis of the second conduit and stabilizing the first conduit.

8. The magnetic sensor system of claim 7 wherein the filler conduits are smaller that the first conduit.

9. The magnetic sensor system of claim 4 further comprising a guide tip coupled to a distal end of the first conduit for preventing routine difficulties.

10. The magnetic sensor system of claim 9 wherein the guide tip includes a distal end, the distal end of the guide tip being curved to prevent the first conduit from becoming ensnared by an obstruction during insertion of the first conduit within the second conduit.

11. A magnetic sensor system, comprising:
- a plurality semi-rigid, elongated first conduits having a predetermined length;
- at least one magnetic sensor disposed at a desired position in at least one of the plurality of semi-rigid, elongated first conduits; and
- a second conduit for providing a pathway for guiding the plurality of semi-rigid, elongated first conduits.

* * * * *